US008650144B2

(12) United States Patent
Sarlos et al.

(10) Patent No.: US 8,650,144 B2
(45) Date of Patent: Feb. 11, 2014

(54) APPARATUS AND METHODS FOR LOSSLESS COMPRESSION OF NUMERICAL ATTRIBUTES IN RULE BASED SYSTEMS

(75) Inventors: Tamas Sarlos, Sunnyvale, CA (US); Jon Rexford Degenhardt, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1433 days.

(21) Appl. No.: 12/031,127

(22) Filed: Feb. 14, 2008

(65) Prior Publication Data

US 2009/0210470 A1 Aug. 20, 2009

(51) Int. Cl.
*G06F 17/00* (2006.01)
*G06N 5/02* (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | | | |
|---|---|---|---|---|
| 5,825,830 | A * | 10/1998 | Kopf | 375/340 |
| 6,567,797 | B1 * | 5/2003 | Schuetze et al. | 1/1 |
| 7,197,497 | B2 | 3/2007 | Cossock | |
| 2002/0159653 | A1 * | 10/2002 | Dekel et al. | 382/282 |
| 2002/0176632 | A1 * | 11/2002 | Chrysafis et al. | 382/239 |

OTHER PUBLICATIONS

Anh et al., "Improved Word-Aligned Binary Compression for Text Indexing", IEEE Transactions on Knowledge and Data Engineering, Jun. 2006, 18(6):857-861.

Breiman, Leo (2001). "Random Forests". Marchine Learning 45 (1), 5-32.
Breiman et al., (1984) "Classification and Regression Trees", Chapter 2: Introduction to Tree Classification, pp. 18-58.
Breiman et al., (1984) "Classification and Regression Trees", Chapter 8, Regression Trees, pp. 216-265.
Friedman et al., "Predictive Learning via Rule Ensembles." Technical Report, Dept. of Statistics, Stanford Univ. (2005).
Friedman, J.H. "Stochastic Gradient Boosting." Technical Report, Dept. of Statistics, Stanford Univ. 1999).
Witten et al., Managing Gigabytes: Compressing and Indexing Documents and Images, Morgan Kaufmann Publishing, (1999), pp. 114-127.
Zukowski et al., "Super-Scalar RAM-CPU Cache Compression." ICDE 2006:59.

* cited by examiner

*Primary Examiner* — Kakali Chaki
*Assistant Examiner* — Ababacar Seck
(74) *Attorney, Agent, or Firm* — Weaver Austin Villeneuve & Sampson LLP

(57) ABSTRACT

Disclosed are apparatus and methods for compressing a set of numerical values for a set of feature values, which can be utilized by a rule based or decision tree system. In certain embodiments, the numerical values are transformed into a subset of integer values based on how they are to be analyzed by conditional processes of the rule based or decision tree system that compare such numerical values to one or more threshold values. This transformation is accomplished such that if the rule based or decision tree system is applied after transformation, identical results are produced as compared to the original numerical values being used by the rule based or decision tree system. Other compression techniques may also be applied to the transformed values. An altered rule based or decision tree system, in which threshold values are also transformed to integer values, may be applied to the transformed values. Alternatively, the rule based or decision tree system may be applied to a set of decoded numerical values.

21 Claims, 7 Drawing Sheets

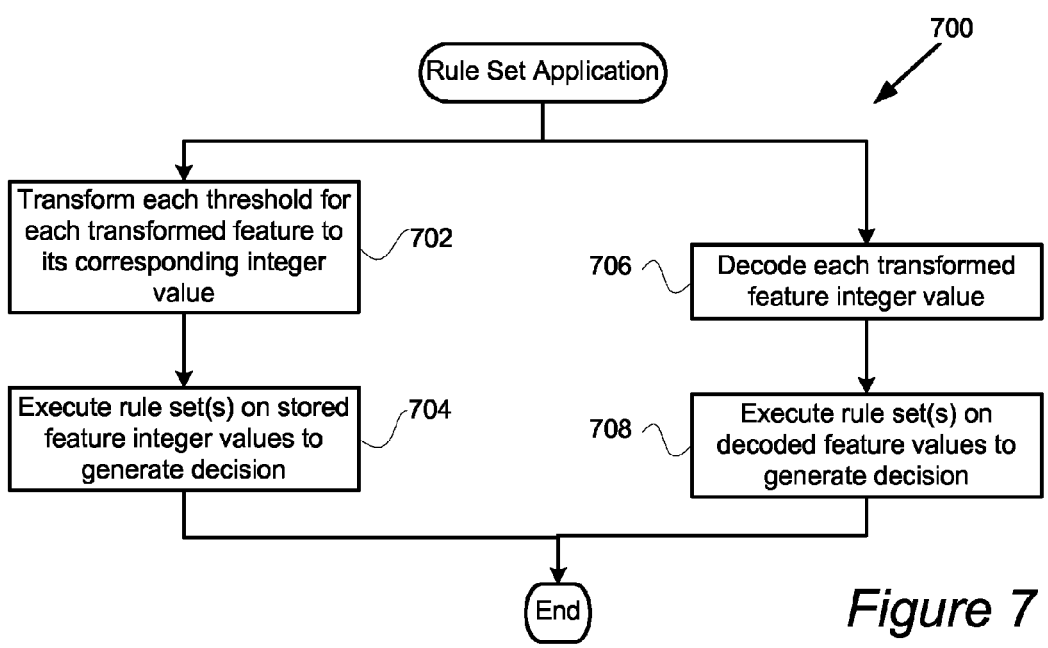

APPARATUS AND METHODS FOR LOSSLESS COMPRESSION OF NUMERICAL ATTRIBUTES IN RULE BASED SYSTEMS

BACKGROUND OF THE INVENTION

The present invention is related to rule based systems or decision trees that operate on a set of object attributes. It especially pertains to providing an accurate representation of such object attributes to the rule based system or decision trees.

A large number of machine learning, pattern recognition, and data mining problems require that a set of objects described by their attributes is classified into one or more of a set of predetermined classes, that an unknown numerical property of the objects needs to be predicted, or that a ranked list of objects is produced. Rule based systems or decision trees provide efficient solutions to these problems in terms of prediction accuracy, training, and classification speed. Although large data sets allow a high level of accuracy to be achieved by inducing ensembles of rules and decision trees that depend on many object attributes, the space usage of these object attributes can grow rapidly.

FIG. 1 is a diagrammatic representation of a decision tree 100 that is utilized to rank search results for an on-line search query over a wide area network, e.g., the Internet. In this example, search results are each ranked by using this decision tree to assess a plurality of search result features. For example, a search result's features may include metrics of the search result itself, the user who initiated the query, query parameters, the context in which the query was issued, or any combination thereof.

As shown, the decision tree includes a plurality of branching elements, e.g., elements 102, 104, 106, 108, and 110. Each element typically represents a conditional operation that is performed with respect to a particular object feature value and a threshold. For instance, element 102 determines whether a Feature__1 value is greater than a threshold value A. If such condition is met, then the next element 104 determines whether a Feature__2 value is greater than threshold value B. Otherwise, element 106 determines whether Feature__3 value is greater than threshold value C. Various elements are applied to different or the same features of a particular search result until a rank value is produced by the decision tree for such particular search result. In the illustrated example, the search result is associated with a rank value equal to 1.27 if the features of such search result meet the conditions of elements 102, 104, and 108. If other conditions were met, the search result would have a different rank value (not shown). The final rank value might be based on any combination (e.g. sum, majority, etc.) of the output of multiple trees or rules. Lastly, the search results are ordered according to their rank value to produce a ranked list of search results.

In order to implement the decision tree of FIG. 1 on a plurality of search result features, a set of search result feature values may be stored locally. If these feature values are floating point values (e.g., non-integers), for example, each feature value may require about 4 to 8 bytes. When the number of features increases, the amount of storage used for such features also increases. As more storage is used for execution in a rule based or decision tree system, this used storage cannot be used for other tasks. As a result of this large memory usage by a rule based or decision tree system, there may be loss of efficiency in the number and types of tasks being implemented with respect to a particular memory.

Accordingly, it would be beneficial to provide mechanisms for conserving memory usage by features values that are used in a rule based or decision tree system.

SUMMARY OF THE INVENTION

Accordingly, apparatus and methods for compressing a set of numerical values for a set of feature values, which can be utilized by a rule based or decision tree system, are provided. In certain embodiments, the numerical values are transformed into a subset of integer values based on how they are to be analyzed by conditional processes of the rule based or decision tree system that compare such numerical values to one or more threshold values. This transformation is accomplished such that if the rule based or decision tree system is applied after transformation, identical results are produced as compared to the original numerical values being used by the rule based or decision tree system. Other compression techniques may also be applied to the transformed values. An altered rule based or decision tree system, in which threshold values are also transformed to integer values, may be applied to the transformed values. Alternatively, the rule based or decision tree system may be applied to a set of decoded numerical values.

In one embodiment, a method for transforming numerical values for a plurality of objects, which each have a plurality of features having a plurality of features values that are to be analyzed by a rule based or a decision tree system having a plurality of conditional elements for comparing feature values to threshold values in order to generate a specified solution to a problem, is disclosed. For a first feature of the objects having a numerical format, all conditional elements that pertain to such first feature are identified. For each set of identified conditional elements of the first feature, a plurality of intervals, which are bounded by the thresholds of the identified conditional elements that pertain to the first feature, are identified. An integer value is assigned to each identified interval. Each features value of the first feature of the objects is transformed into the integer value that was assigned to one of the intervals that was identified for such first feature and into which the each feature value belongs. Each transformed feature value is stored for use by the rule based or decision tree system.

In a specific implementation, the operations of identifying all conditional elements and intervals, transforming, and storing are performed for all features having a numerical format. In another aspect, the first feature has a floating point number format or a large integer number format. In another embodiment, the rule based or decision tree system is operable to rank a plurality of search result objects in an on-line search service and the features specify a metric of the search result objects, of a user who initiated a search request, and/or of the search request. In yet another embodiment, a further compression technique, which is adapted for compression of integer values, is applied to the transformed feature values prior to storing such feature values.

In a further embodiment, each threshold of the rule based or decision tree system that pertains to the first feature is transformed into a corresponding integer value, and the transformed rule based or decision tree system is executed on the feature values after transformation has occurred for the first feature. In another implementation, each transformed feature value is decoded into a numerical value, and the transformed rule based or decision tree system is executed on the decoded feature values, as well as non-transformed feature values.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures which illustrate by way of example the principles of the invention.

BRIEF DESCRIPTION OF THE DRAWINGS

FIG. 6A is a table showing a plurality of feature numerical values for a plurality of documents.

FIG. 6B is a table showing a plurality of feature integer values for a plurality of documents as transformed from the feature numerical values of FIG. 6A in accordance with one embodiment of the present invention.

FIG. 6C shows a table specifying the original numerical value range for each feature interval of the popularity and the frequency features in accordance with one embodiment of the present invention.

FIG. 6D shows example decoded feature values for the transformed feature values of FIG. 6B in accordance a specific implementation of the present invention.

FIG. 7 is a flowchart illustrating a procedure for application of a rule set or decision tree system after a transformation process in accordance with one implementation of the present invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention include mechanisms to efficiently store numerical values of features that are to be analyzed by a rule based or decision tree system. The numerical values are mapped to a subset of integer values based on how they are to be analyzed by the rule based or decision tree system such that the results that are to be generated by the rule based or decision tree system are the same with or without such mapping operation being performed on the feature values. The subset of integer values to which the numerical values are mapped can have a significantly lower cardinality and utilize a smaller memory size than the original set of numerical values. Accordingly, the dataset of feature values can be significantly reduced in terms of storage size.

An example situation, in which such a mapping or transformation technique may be useful, generally relates to a search service that is provided over a computer network, e.g., the Internet. Although several example embodiments of a mapping technique will now be described with respect to a search application, of course, the mapping techniques of the present invention can be applied to a diverse number and/or type of applications that utilize rule based or decision tree type systems to analyze a set of numerical feature values. Examples of other applications include techniques for selecting or displaying advertisements over a computer, mobile phone, or TV network, recommending items to users, or selecting content to be delivered to the user etc. In general, the inventive method embodiments are applicable anywhere a large number of decisions involving numerical attributes are to be made under resource constraints.

Figure 1:
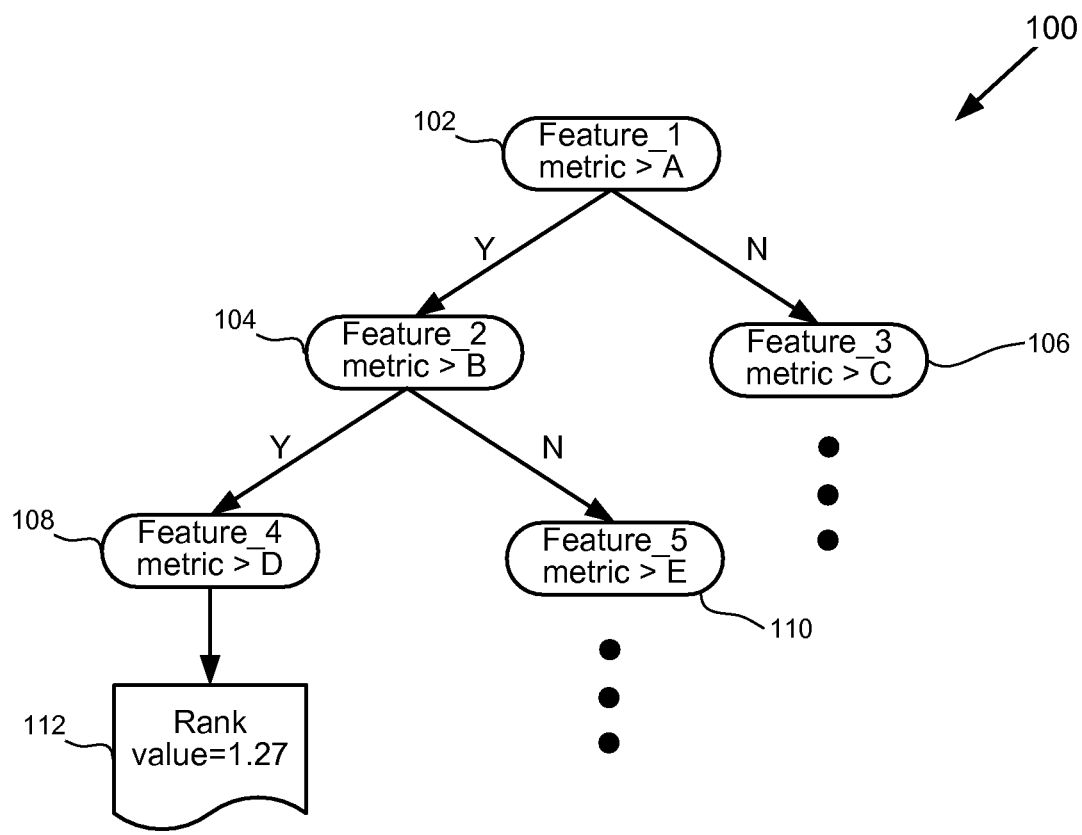
FIG. 1 is a diagrammatic representation of an example decision tree that is utilized to rank search results for an on-line search query over a wide area network.
Figure 2:
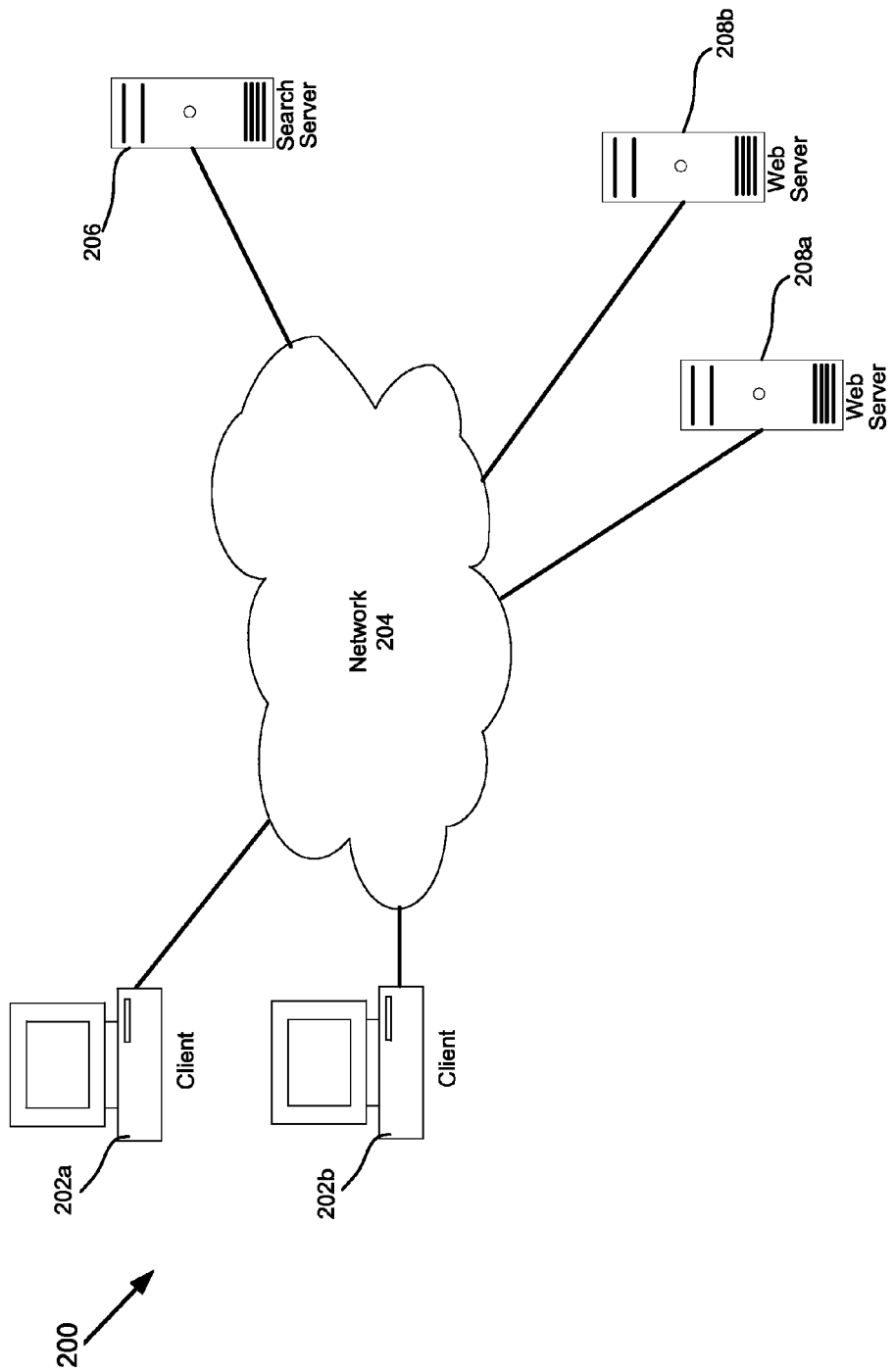
FIG. 2 illustrates an example network segment in which the present invention may be implemented in accordance with one embodiment.

FIG. 2 illustrates an example network segment 200 in which the present invention may be implemented in accordance with one embodiment. This example network segment 200 includes a plurality of clients 202 that are operable to perform (e.g., for a user) a search in conjunction with one or more search servers 206 via network 204. For instance, a user may initiate a search by sending a search query from one or more clients 202 to one or more search servers 206 via network 204.

The network 204 may take any suitable form, such as a wide area network or portions of the Internet and/or one or more local area networks (LAN's). The network 204 may include any suitable number and type of devices, e.g., routers and switches, for forwarding requests from the client to the servers and then sending responses from the servers back to the requesting clients, as well as other types of data communicated between clients and servers.

Each search server 206 may take any suitable form for performing searches. Referring back to the illustrated embodiment, the search application of a search server 206 may present a web page having any input feature to the client so the client can enter one or more search term(s). In a typical implementation, the search application includes an input box into which a user may type any number of search terms. Embodiments of the present invention may be employed with respect to any search application, and example search applications include Yahoo! Search, Google, Microsoft MSN and Live Search, Ask Jeeves, etc. The search application may be implemented on any number of servers although only a single search server 206a is illustrated for clarity.

When a search for one or more search terms is initiated in a query to a search server 106, the search server then locates a plurality of web documents or other objects that relate to the search terms. These documents/objects can be found on any number of web servers, e.g., 208a or 208b and usually enter the search server via a crawling and indexing pipeline possibly performed by a different set of computers (not shown). The plurality of located web documents or other objects may then be analyzed by a rule based or decision tree system to determine a "goodness" or relevance ranking. For instance, the documents or objects are ranked in order from most relevant to least relevant based on a plurality of feature values of the documents/objects, the user who initiated the search with a search request, and/or the search request. Once the documents/objects are ranked, the ranked lists of documents/objects can then be presented to the user in a search results list that is ordered based on ranking. The ranking processes may be performed by the search server which has received the search query or by another server, such as a specially configured ranking server (not shown).

Embodiments of the present invention for compressing numerical feature values may be applied to the feature values used in a search application. For instance, the feature values that take the form of numerical values (e.g., floating point numbers) may be transformed into a predefined set of integers before being stored for further processing, e.g., document ranking. Of course, the techniques of the present invention may be applied to numerical values that are utilized by other types of processing, besides a search ranking process. In general, the rule based or decision tree system may take the form of any machine learning, pattern recognition, or data mining tool that utilizes a set of objects (e.g., documents) described by their attributes or features to thereby classify such features into one or many of a predetermined set of classes, predict an unknown numerical property of the objects, or produce a ranked list of objects, e.g., in decreasing order of goodness or relevance. Machine learning tools based on inducing rules and decision trees, and ensemble methods thereof in particular, provide efficient solutions to the above outlined problems in terms of prediction accuracy, training, and classification speed, by way of examples. Although large feature datasets allow a greater accuracy by inducing ensembles of rules and decision trees that depend on feature attributes of the objects in these datasets, the space usage for these features grows rapidly as many of the feature values require 4 or 8 byte floating point numbers or large integer numbers.

Figure 3:
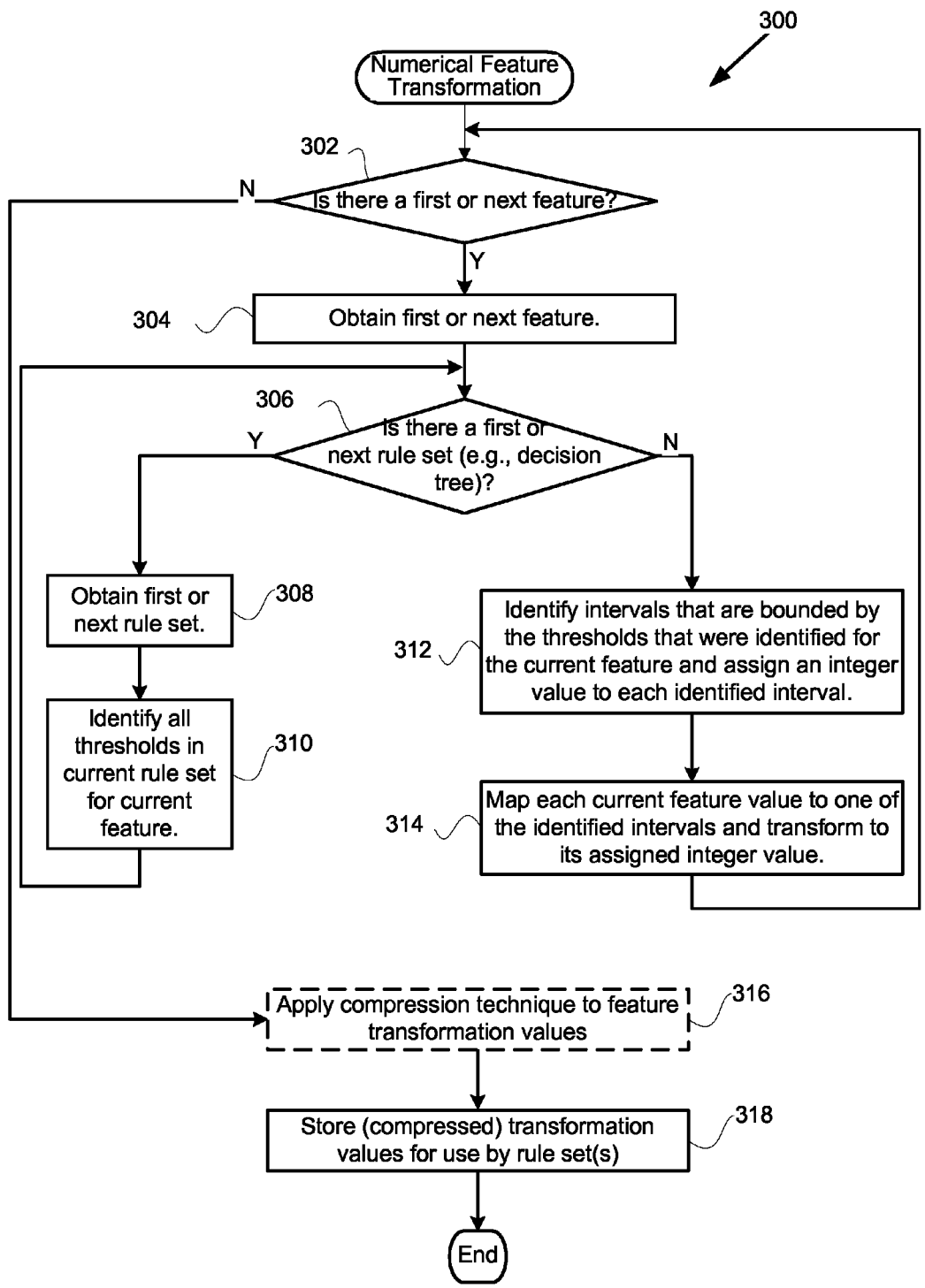
FIG. 3 is a flowchart illustrating a procedure for implementing a numerical feature transformation in accordance with one embodiment of the present invention.

FIG. 3 is a flowchart illustrating a procedure 300 for implementing a numerical feature transformation in accordance with one embodiment of the present invention. Initially, it is determined whether there is a first or next feature in operation 302. If there is a first or next feature, the first or next feature is obtained in operation 304. Otherwise, the procedure ends for the current dataset. The following transformation procedures may be applied to any number and type of features that have numerical values for a given set of features, e.g., the feature dataset for a plurality of web documents that are to be ranked by a decision tree. For instance, transformation techniques may be applied to one or more features which are in the form of floating point values or large integers, which require a relatively large amount of storage space.

For the current feature, it may then be determined whether there is a first or next rule set (e.g., decision tree) in operation 306. If there is a first or next rule set this first or next rule set is obtained in operation 308. The following transformation techniques may be applied to the numerical values for a current feature based on one or more rule sets or decision trees that will later be used to process such feature values as described further below.

After a current rule set is obtained, all thresholds are then identified in the current rule set for the current feature in operation 310. For instance, the current rule set will include one or more conditional elements for comparing the current feature's value for multiple objects to one or more thresholds.

Figure 4:
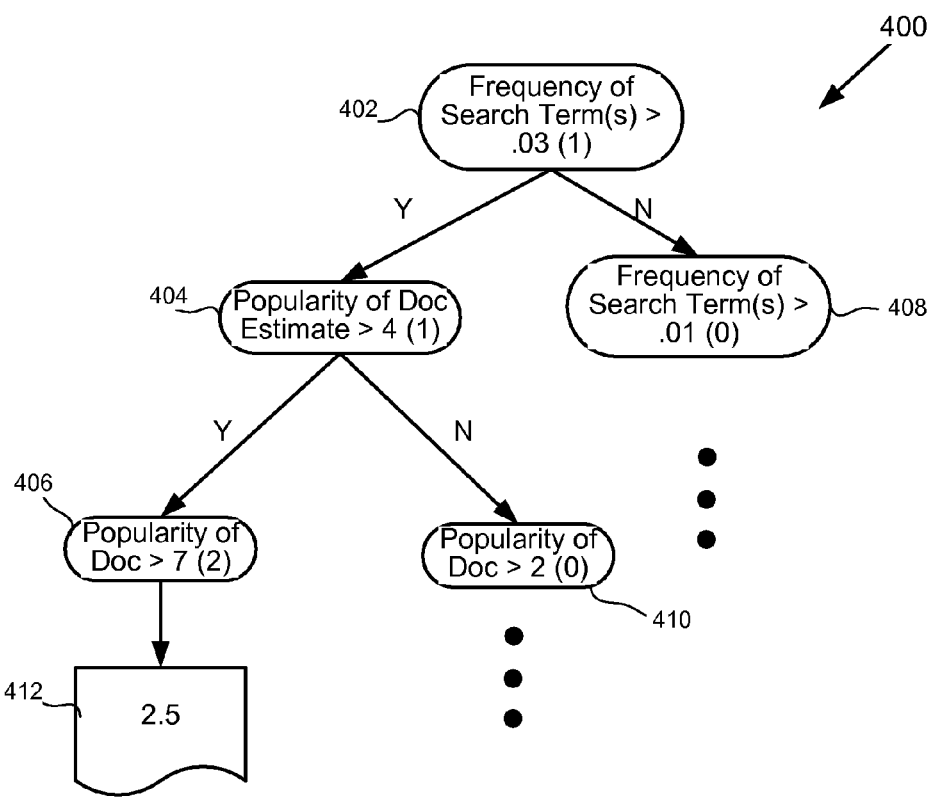
FIG. 4 is a diagrammatic representation of another example decision tree that is utilized to rank search results for an on-line search query over a wide area network.

FIG. 4 is a diagrammatic representation of an example decision tree 400 that can be utilized to rank search results for an on-line search query over a wide area network, e.g., the Internet. As shown, the decision tree 400 includes conditional elements 402, 404, 406, 408, 410, etc. In general, this decision tree can be used to rank each document object that results from a search query. This ranking is may be based on analysis by the conditional elements of a plurality of feature values of each document object.

Each conditional element operates to compare one or more feature values for a particular document object to one or more thresholds. By way of example, conditional elements 402 and 408 compare the feature for the frequency of the search term(s) within each document to two different thresholds, 0.03 and 0.01, respectively. Thus, the identified thresholds for the feature for the frequency of the search term(s) are 0.03 and 0.01. Likewise, the identified thresholds for the feature for the popularity of each document include the threshold values 4, 7, and 2 from condition elements 404, 406, and 410, respectively. Although the conditional elements of the illustrated decision trees each compare a feature's value to a single threshold, of course, a single conditional element may alternatively compare a feature's values to two thresholds, e.g., a range limit or uses any of the less than, less or equal to, equal, greater, greater or equal comparison tests.

In general, this type of decision tree operates to rank a plurality of documents based on a plurality of feature values as analyzed by a plurality of conditional elements. In this example, the topmost conditional element 402 determines whether the feature value for the frequency of one or more search term(s) that are present within the particular document is greater than 0.03. If the frequency is greater, the conditional element 404 then determines whether the feature value for the popularity of the particular document is greater than 4. If the popularity value is greater than 4, the conditional element 406 then determines whether the popularity value for the particular document is greater than 7. If the popularity value is greater than 7, then the particular document is ranked with a value of 2.5, which is the solution that is produced by this decision tree for this particular document. Other documents would likely result in different ranking values.

Referring back to the transformation procedure 300 of FIG. 3, after a set of thresholds are identified for the current feature and the current decision tree, thresholds continue to be identified for each rule set (e.g., that is applicable to the current feature) in operations 308 through 310. That is, if multiple decision trees exist for the same feature set, all thresholds from all decision trees may be identified for the current feature.

When there are no more rule sets to obtain for the current feature, the feature values for the current feature are then transformed based on the corresponding identified thresholds as described in operations 308 and 310, for example. For example, intervals that are bounded by the thresholds that were identified for the current feature are also identified and an integer value is assigned to each identified interval in operation 312. Each current feature value is then mapped to one of the identified intervals and transformed to its assigned integer value in operation 314. The procedure 300 then continues through the next feature if present.

The example procedure of FIG. 3 is merely illustrative and the operations and loops could be performed in alternative ways. For instance, all of the decision trees or rule sets may first be assessed to build a list of all thresholds for each feature simultaneously. The lists of thresholds for each feature could then be processed. Alternatively, a single list of thresholds for all features could be built, sorted by feature (or assessed by feature), and processed as a continuous block of features.

Figure 5A:
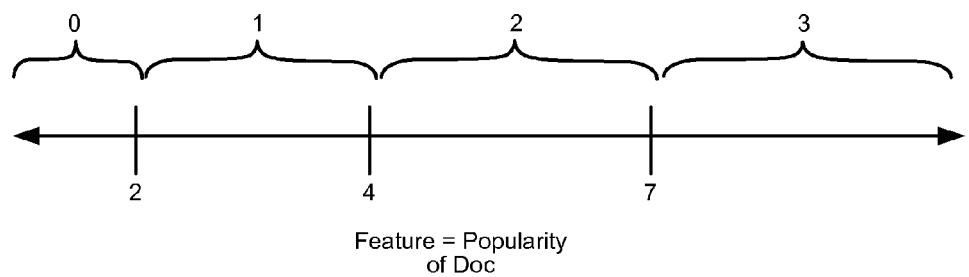
FIG. 5A is a diagrammatic representation of a transformation process for a popularity feature value for a plurality of search result documents in accordance with an example implementation of the present invention.

An example transformation process will now be described for the example decision tree of FIG. 4. FIG. 5A is a diagrammatic representation of a transformation process for a popularity feature value for a plurality of search result documents in accordance with an example implementation of the present invention. In general, the thresholds that were identified for the popularity feature (i.e., 2, 4, and 7) serve as boundaries for a plurality of intervals. Each interval can then be assigned consecutive integer values (or other non-consecutive integer values). Also, the intervals and assigned integers can be chosen so that a feature value that falls within such interval will be assessed correctly by the corresponding conditional element of the decision tree. For instance, the interval that includes feature values which are less than and equal to 2 are assigned a first integer value of 0. The feature value 2 is included within this interval (as opposed to the next interval) because the conditional element 410 determines whether a popularity value is greater than 2. That is, popularity values that are less than are equal to 2 will result in a "no" determination, while popularity values that are greater than 2 will result in a "yes" determination. Thus, the first appropriate interval with respect to conditional element 410 includes feature values that are less than and equal to 2, while the second interval includes values that are greater than 2, which is assigned an incremented "1" integer value.

Similarly, this next interval includes feature values that are less than or equal to 4 (and greater than 2) so that the conditional element 404 will be applied correctly. The next interval that includes features values that are greater than 4 (e.g., based on conditional element 404) and less than or equal to 7 (e.g., based on conditional element 406 is assigned an incremented integer value of "2". The next interval that includes features values that are greater than 7 (e.g., based on conditional element 406) is assigned an incremented integer value of "3".

Figure 5B:
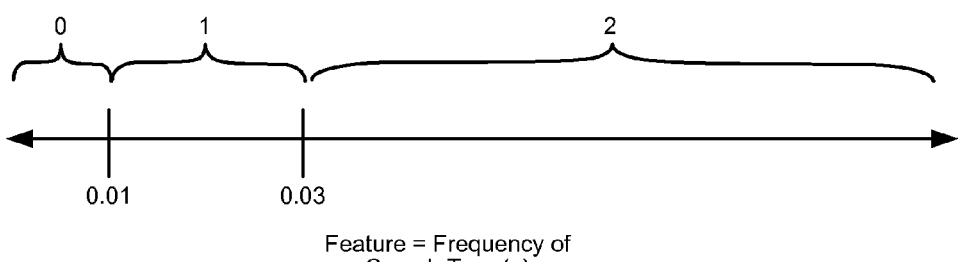
FIG. 5B is a diagrammatic representation of a transformation process for a normalized frequency feature value for search terms within a plurality of search result documents in accordance with example implementation of the present invention.

FIG. 5B is a diagrammatic representation of a transformation process for a normalized frequency feature value for search terms within a plurality of search result documents in accordance with example implementation of the present invention. As shown, the first interval that includes feature values less than and equal to 0.01 (as based on the conditional element 408) is assigned a first integer value of "0." The next interval that includes feature values that are greater than 0.01 and less than or equal 0.03 (as based on conditional element 402) is assigned integer value "1", while the next interval that includes feature values greater than 0.03 are assigned the integer value "2."

In one specific implementation of operation 312, if $t\_1, \ldots, t\_n$ are the distinct thresholds, then these thresholds can be sorted and the result can be denoted by $u\_1 < u\_2 < \ldots < u\_n$, with $u\_0 = -\infty$ and $u\_{n+1} = +\infty$. Assuming that only the feature value>$t\_i$ type tests in FIG. 4 are used, the unique index for each feature value can be identified, e.g., $u\_j <$ feature value $\leq u\_{j+1}$. This feature value can then be mapped to the integer j, e.g., it falls to the jth interval, $I\_j = (u\_j, u\_{j+1}]$, right end point is included, left is not. To apply the rule based system, either the integer j is mapped to anything in the jth interval or if a test was of the form feature>$u\_j$, the integer may be replaced with integer_feature>j. Similar schemes may apply if using <, <=, etc tests, e.g., if the rule based system's element includes feature value <threshold tests only, then $I\_j = [u\_j, u\_{j+1})$, right end point is not included, but the left is.

FIG. 6A is a table showing a plurality of example feature numerical values for a plurality of documents. FIG. 6B is a table showing a plurality of feature integer values for a plurality of documents as transformed from the feature numerical values of FIG. 6A in accordance with one embodiment of the present invention. By way of example, document "Doc__1" initially has a popularity value of 4.0 and a search term frequency value of 0.005 as shown in FIG. 6A. These feature values are transformed into an integer value of 1 for the popularity value and an integer value of 0 for the search term frequency value as shown in FIG. 6B.

Referring back to the transformation procedure of FIG. 3, when all feature values have been transformed (or alternatively after transformation of any feature value), a compression technique may be applied to the feature transformation values in operation 316. Additionally, any compression techniques that can be applied to integers (or is adapted for compression of integer values) may be utilized to further compress integer feature values to further conserve storage space. By way of example, the non-negative integer values could be encoded with fixed codes on ceil($\log_2(n+1)$) bits, wherein n is the number of thresholds for the corresponding feature. In another example, the integers could be encoded with Huffman codes. Alternatively, one could assign the integer interval 0 as the most frequent interval, 1 to the second most frequent, etc., and then encode the interval indices with schemes designed for small integers, such as Gamma, Delta, Golomb, Rice, VarByte, Simple-9, PFOR, etc. Furthermore, to exploit the correlation of features, multiple or all features of an object could be compressed at once by combining their integer representation into one, larger, integer and applying the before mentioned techniques. The transformation values or compressed transformation values are then stored for use by the rule sets in operation 318.

Several of the above referenced integer compression schemes are described further in the following documents or document portions, which are incorporated herein by reference in their entirety: (i) Ian H. Witten, Alistair Moffat, and Timothy C. Bell: Managing Gigabytes: Compressing and Indexing Documents and Images, Morgan Kaufmann Publishing, (1999), (ii) V. N. Anh, A. Moffat. "Improved Word-Aligned Binary Compression for Text Indexing", IEEE Transactions on Knowledge and Data Engineering, June 2006, 18(6):857-861, and (iii) Marcin Zukowski, Sándor Héman, Niels Nes, Peter A. Boncz: Super-Scalar RAM-CPU Cache Compression. ICDE 2006:59.

FIG. 7 is a flowchart illustrating a procedure 700 for application of a rule set or decision tree system after a transformation process in accordance with one implementation of the present invention. In the illustrated embodiment, two different applications of a rule set may be undertaken with respect to the transformed feature values. In a first application, each threshold for each transformed feature (e.g., in the applicable one or more decision trees) is transformed to its corresponding integer value in operation 702. In the example of FIG. 4, the threshold "0.03" of conditional element 402 is transformed into integer value 1 as shown in parenthesis. The threshold "4" of element 404 is transformed into integer "1".

The threshold "7" of element 406 is transformed into integer "2". The threshold "0.01" of element 408 is transformed into integer "0". Lastly, the threshold "2" of element 410 is transformed into integer "0".

After the thresholds of the rules sets are transformed, the rule sets are then executed on the stored feature integer values to generate a decision in operation 704. The accuracy of these transformations can easily be verified by assessing the results of applying both the original and transformed thresholds of the decision tree 400 of FIG. 4 to both the original and transformed values of the document "Doc_1". Applying the decision tree to original numerical values, the original value for the original search term frequency of 0.005 for the "Doc_1" document causes the topmost conditional element 402 to result in a "no" answer since 0.005 is not greater than original threshold 0.03. The next conditional element 408 determines that the original frequency value 0.005 is also not greater than original threshold 0.01 and results in a "no" answer. Of course, other conditional element (not shown) would continue to assess the feature values; however, only the outcomes of a subset of conditional elements will be described herein so as to simplify the explanation.

Using the transformed feature and threshold values, the topmost conditional element 402 results in a "no" answer since the transformed feature value 0 for the frequency of object "Doc_1" is not greater than the transformed threshold integer value 1. The next conditional element 408 determines that the transformed frequency value 0 is also not greater than the transformed threshold of 0 and results in a "no" answer. This decision path is the same using both the original and the transformed feature and threshold values. Thus, the transformation process is accurate and would result in the same ranking for a particular document, as compared to using the untransformed numbers.

In a second application as shown in FIG. 7, each transformed feature integer value is decoded in operation 706. The one or more rule sets are then executed on the decoded feature values to generate a decision in operation 708. Decoding requires that the transformed integer values be transformed back to a numerical number that falls within the same, original interval as the original numerical value prior to transformation. In this implementation, a mapping between the interval boundaries and the corresponding thresholds may be retained so that the transformed feature values may be decoded to a value in the correct, original interval region. FIG. 6C shows a table specifying the original numerical value range for each feature interval of the popularity and the frequency features in accordance with one embodiment of the present invention. These retained feature interval ranges can then be used to decode each feature integer value into a decoded value that falls within the corresponding original numerical interval so that the decoded numerical value will achieve the same result with the decision tree as the original numerical values. FIG. 6D shows example decoded feature values for the transformed feature values of FIG. 6B in accordance a specific implementation of the present invention.

The integer values may be decoded using any suitable technique so that the decoded values will be assessed by the decision tree in a same way as the original feature values. In one implementation, the integer value can be decoded into a decoded value that is a midway point in the corresponding interval. Referring to the popularity intervals shown in FIG. 5A, an integer value of 1 can be decoded into a midway value of 3.0 and an integer value of 2 can be decoded into a midway value of 5. The end intervals 0 and 3 may have to be decoded differently since there is no midpoint in these intervals. In one implementation, an integer may also be decoded by decrementing or incrementing the boundary original value by 1, 0.1, or 0.001, etc., depending on the granularity of the particular interval. In the popularity example, integer 0 may be decoded into a value of 1 (boundary 2−1), and the integer 3 may be decoded into a value of 8 (boundary 7+1). The other integer values, besides the end intervals, may also be decoded using this method as shown for the Search Term Frequency values in FIG. 6D.

The accuracy of these transformations and decoding can easily be verified by assessing the results of applying original thresholds of the decision tree 400 of FIG. 4 to both the original and decoded feature values of the document "Doc_3". Applying the decision tree to original numerical values, the original value for the search term frequency of 0.042 for the object "Doc_3" document causes the topmost conditional element 402 to result in a "yes" answer since 0.042 is greater than the threshold 0.03. The next conditional element 404 then determines that the popularity value 7.777 is greater than 4 and results in a "yes" answer. The next conditional element 406 then determines whether the popularity value 7.777 is greater than 7, resulting in a "yes" answer from conditional element 406 and a ranking value of 2.5 for document "Doc_3."

Using the decoded feature and threshold values, the decoded value 0.04 for the search term frequency for the object "Doc_3" document causes the topmost conditional element 402 to result in a "yes" answer since decoded value 0.04 is greater than the threshold 0.03. The next conditional element 404 then determines that the decoded popularity value 8 is greater than the threshold 4 and results in a "yes" answer. The next conditional element 406 then determines whether the decoded popularity value 8 is greater than 7, resulting in a "yes" answer from conditional element 406 and a ranking value of 2.5 for document "Doc_3," which result is identical to the results for the original feature values. Accordingly, the transformation and decoding techniques will produce identical results as compared with the original feature values.

Embodiments of the present invention for transforming, compressing, and decoding feature values can facilitate induction of rule set or decision tree systems. For instance, responding to a user action, e.g., to a query in a search engine or to a page view in an advertisement system, involves applying one or more decision trees or a rule based system to a large number of objects. Usually, each of the objects are described by a set of pre-computed and a set of on the fly generated feature values, and the outcome of the decision tree(s) or rules depends on a complex combination of such feature values. The feature values may be stored on disk, or in a main memory for fast random access. In a distributed system, any of the feature values could be also transferred through the network. Smaller data size implies faster transfer times in these applications and allows a larger number of objects to be stored on a single computer with a fixed memory (e.g., RAM) size or to free up memory for other uses.

Figure 8:
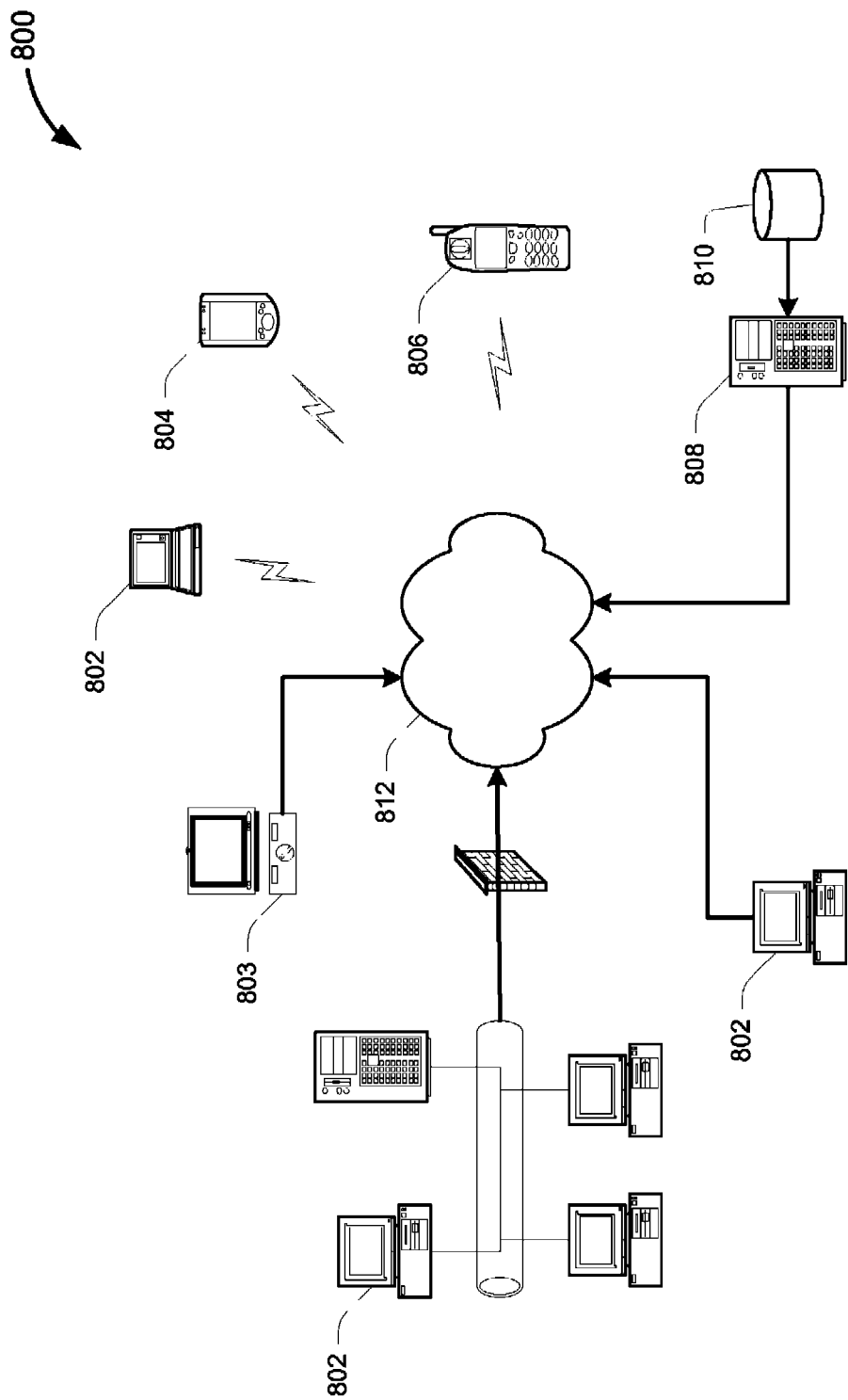
FIG. 8 is a simplified diagram of a network environment in which specific embodiments of the present invention may be implemented.

Embodiments of the present invention may be employed to perform transformation and/or decoding and/or compression techniques in any of a wide variety of computing contexts. For example, as illustrated in FIG. 8, implementations are contemplated in which the relevant population of users interact with a diverse network environment via any type of computer (e.g., desktop, laptop, tablet, etc.) 802, media computing platforms 803 (e.g., cable and satellite set top boxes and digital video recorders), handheld computing devices (e.g., PDAs) 804, cell phones 806, or any other type of computing or communication platform.

And according to various embodiments, user on-line behavior and object feature values may be obtained using a wide variety of techniques. For example, feature values representing a user's interaction with a local application, web site or web-based application or service may be accomplished using any of a variety of well known mechanisms for recording and determining a user's behavior. However, it should be understood that such methods are merely exemplary and that status information may be collected in many other ways.

Once user behavior information and feature information have been obtained, this information may be analyzed and used to generate feature values according to the invention in some centralized manner. This is represented in FIG. 8 by server 808 and data store 810 that, as will be understood, may correspond to multiple distributed devices and data stores. The invention may also be practiced in a wide variety of network environments (represented by network 812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 9:
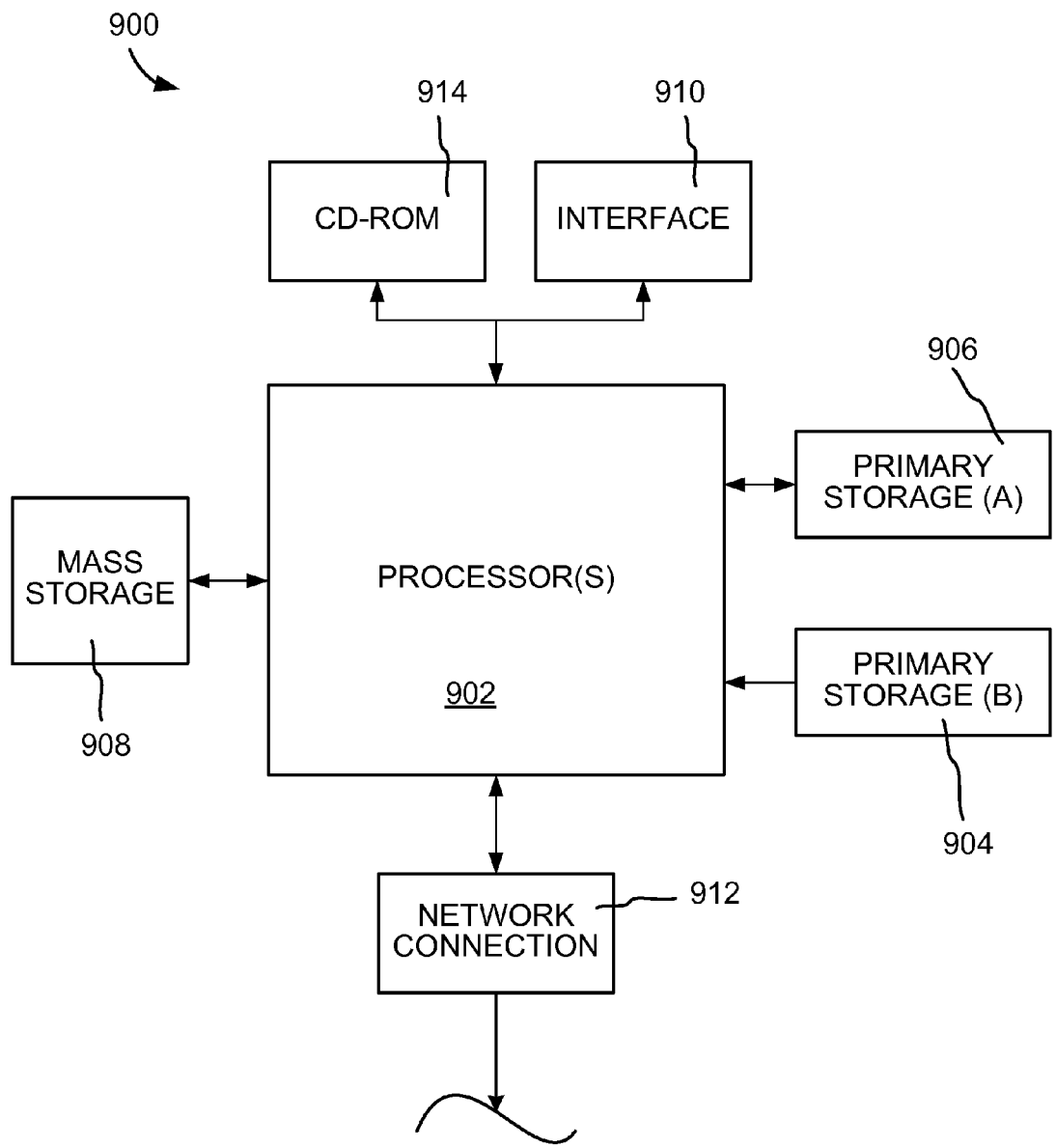
FIG. 9 illustrates an example computer system in which specific embodiments of the present invention may be implemented.

FIG. 9 illustrates a typical computer system that, when appropriately configured or designed, can serve as a feature value transformer and/or decoder and/or a rule based or decision tree system. The computer system 900 includes any number of processors 902 (also referred to as central processing units, or CPUs) that are coupled to storage devices including primary storage 906 (typically a random access memory, or RAM), primary storage 904 (typically a read only memory, or ROM). CPU 902 may be of various types including microcontrollers and microprocessors such as programmable devices (e.g., CPLDs and FPGAs) and unprogrammable devices such as gate array ASICs or general-purpose microprocessors. As is well known in the art, primary storage 904 acts to transfer data and instructions uni-directionally to the CPU and primary storage 906 is used typically to transfer data and instructions in a bi-directional manner. Both of these primary storage devices may include any suitable computer-readable media such as those described herein. A mass storage device 908 is also coupled bi-directionally to CPU 902 and provides additional data storage capacity and may include any of the computer-readable media described above. Mass storage device 908 may be used to store programs, data and the like and is typically a secondary storage medium such as a hard disk. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to an external device such as a database or a computer or telecommunications network using an external connection as shown generally at 912. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store user behavior information, user category and education scores, query information, query results information, feature values, transformed and/or compressed feature values, decoded feature values, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer-implemented method for transforming numerical values for a plurality of objects that each have a plurality of features having a plurality of features values that are to be analyzed by a rule based or a decision tree system having a plurality of conditional elements for comparing feature values to threshold values in order to generate a specified solution to a problem, comprising:

for a first feature of the plurality of objects, a feature value of the first feature having a numerical format, using one or more computing devices, identifying conditional elements that pertain to the first feature, the identified conditional elements for comparing feature values of the first feature to threshold values for the first feature;

for each of the identified conditional elements that pertain to the first feature, using the one or more computing devices, identifying a plurality of intervals that are bounded by the threshold values of the corresponding one of the identified conditional elements that pertain to the first feature and assigning an integer value to each of the identified plurality of intervals, the integer value assigned to each of the identified plurality of intervals being independent from the feature values of the first feature;

using the one or more computing devices, transforming, for each of the plurality of objects, the feature value of the first feature into the integer value that was assigned to one of the intervals that was identified for the first feature and into which the feature value belongs; and storing in a data store each transformed feature value for use by the rule based or decision tree system.

2. A method as recited in claim 1, further comprising performing, for all features having a numerical format, the operations of identifying all conditional elements and intervals, transforming, and storing.

3. A method as recited in claim 1, wherein the first feature has a floating point number format or a large integer number format.

4. A method as recited in claim 1, wherein the plurality of objects each comprises a search object, and wherein the rule based or decision tree system is operable to rank a plurality of search result objects in an on-line search service, and wherein each of the plurality of features specifies a corresponding one of a plurality of metrics of the search result objects, of a user who initiated a search request, and/or of the search request.

5. A method as recited in claim 1, further comprising applying a further compression technique, which is adapted for compression of integer values, to the transformed feature values prior to storing such feature values.

6. A method as recited in claim 1, further comprising:
transforming each threshold value of the rule based or decision tree system that pertains to the first feature into a corresponding integer value; and
executing the transformed rule based or decision tree system on the feature values after transformation has occurred for the first feature.

7. A method as recited in claim 1, further comprising:
decoding each transformed feature value into a numerical value; and
executing the transformed rule based or decision tree system on the decoded feature values.

8. An apparatus comprising at least a processor and a memory, wherein the processor and/or memory are configured to perform the following operations:
for a first feature of a plurality of objects, a feature value of the first feature having a numerical format, identifying all conditional elements that pertain to the first feature, the identified conditional elements for comparing feature values of the first feature to threshold values for the first feature;
for each of the identified conditional elements that pertain to the first feature, identifying a plurality of intervals that are bounded by the threshold values of the corresponding one of the identified conditional elements that pertain to the first feature and assigning an integer value to each of the identified plurality of intervals, the integer value assigned to each of the identified plurality of intervals being independent from the feature values of the first feature;
transforming, for each of the plurality of objects, the feature value of the first feature into the integer value that was assigned to one of the intervals that was identified for the first feature and into which the feature value belongs; and
storing each transformed feature value for use by the rule based or decision tree system.

9. An apparatus as recited in claim 8, wherein the processor and/or memory are further configured to perform, for all features having a numerical format, the operations of identifying all conditional elements and intervals, transforming, and storing.

10. An apparatus as recited in claim 8, wherein the first feature has a floating point number format or a large integer number format.

11. An apparatus as recited in claim 8, wherein the plurality of objects each comprises a search object, and wherein the rule based or decision tree system is operable to rank a plurality of search result objects in an on-line search service, and wherein each of the plurality of features specifies a corresponding one of a plurality of metrics of the search result objects, of a user who initiated a search request, and/or of the search request.

12. An apparatus as recited in claim 8, wherein the processor and/or memory are further configured to apply a further compression technique, which is adapted for compression of integer values, to the transformed feature values prior to storing such feature values.

13. An apparatus as recited in claim 8, wherein the processor and/or memory are further configured to perform the following operations:
transforming each threshold value of the rule based or decision tree system that pertains to the first feature into a corresponding integer value; and
executing the transformed rule based or decision tree system on the feature values after transformation has occurred for the first feature.

14. An apparatus as recited in claim 8, wherein the processor and/or memory are further configured to perform the following operations:
decoding each transformed feature value into a numerical value; and
executing the transformed rule based or decision tree system on the decoded feature values.

15. At least one non-transitory computer readable storage medium having computer program instructions stored thereon that are arranged to perform the following operations:
for a first feature of a plurality of objects, a feature value of the first feature having a numerical format, identifying all conditional elements that pertain to the first feature, the identified conditional elements for comparing feature values of the first feature to threshold values for the first feature;
for each of the identified conditional elements that pertain to the first feature, identifying a plurality of intervals that are bounded by the threshold values of the corresponding one of the identified conditional elements that pertain to the first feature and assigning an integer value to each of the identified plurality of intervals, the integer value assigned to each of the identified plurality of intervals being independent from the feature values of the first feature;
transforming, for each of the plurality of objects, the feature value of the first feature into the integer value that was assigned to one of the intervals that was identified for the first feature and into which the feature value belongs; and
storing each transformed feature value for use by the rule based or decision tree system.

16. At least one computer readable storage as recited in claim 15, wherein the computer program instructions are further arranged to, for all features having a numerical format, perform the operations of identifying all conditional elements and intervals, transforming, and storing.

17. At least one computer readable storage as recited in claim 15, wherein the first feature has a floating point number format or a large integer number format.

18. At least one computer readable storage as recited in claim 15, wherein the plurality of objects each comprises a search object, and wherein the rule based or decision tree system is operable to rank a plurality of search result objects in an on-line search service, and wherein each of the plurality of features specifies a corresponding one of a plurality of metrics of the search result objects, of a user who initiated a search request, and/or of the search request.

19. At least one computer readable storage as recited in claim 15, wherein the computer program instructions are further arranged to apply a further compression technique, which is adapted for compression of integer values, to the transformed feature values prior to storing such feature values.

20. At least one computer readable storage as recited in claim 15, wherein the computer program instructions are further arranged to perform the following operations:
   transforming each threshold value of the rule based or decision tree system that pertains to the first feature into a corresponding integer value; and
   executing the transformed rule based or decision tree system on the feature values after transformation has occurred for the first feature.

21. At least one computer readable storage as recited in claim 15, wherein the computer program instructions are further arranged to perform the following operations:
   decoding each transformed feature value into a numerical value; and
   executing the transformed rule based or decision tree system on the decoded feature values.

* * * * *